United States Patent [19]

Cagle et al.

[11] Patent Number: 4,714,578

[45] Date of Patent: Dec. 22, 1987

[54] MOLDING OF INTEGRAL SOCKET CONNECTION IN CENTRIFUGALLY CAST FIBERGLASS REINFORCED PIPE

[75] Inventors: Larry L. Cagle; Keith D. Andersen; Victor E. Lurvey, all of Sand Springs, Okla.

[73] Assignee: Fibercast Company, Sands Spring, Okla.

[21] Appl. No.: 654,796

[22] Filed: Sep. 26, 1984

[51] Int. Cl.⁴ ............................................. B29C 5/04
[52] U.S. Cl. ........................... 264/255; 264/270; 264/311; 138/141; 285/423
[58] Field of Search ............... 264/255, 258, 270, 257, 264/311; 156/74; 138/109, 140, 141; 285/423, 231, 919

[56] References Cited

U.S. PATENT DOCUMENTS

| | | |
|---|---|---|
| 2,779,976 | 2/1957 | Roberts et al. |
| 2,785,442 | 3/1957 | Boggs ........................ 264/311 X |
| 2,859,151 | 11/1958 | Usab et al. ................... 264/311 X |
| 2,961,716 | 11/1960 | Luenberger ................... 156/74 X |
| 2,999,780 | 9/1961 | Perrault ....................... 156/74 X |
| 3,093,160 | 6/1963 | Boggs ........................ 264/257 X |
| 3,112,530 | 12/1963 | Boggs et al. ...................... 18/26 |
| 3,788,916 | 1/1974 | Gacelius ..................... 264/270 X |
| 3,885,016 | 5/1975 | Pivar ........................ 264/270 X |
| 3,928,491 | 12/1975 | Waters ........................... 260/837 |
| 4,018,250 | 4/1977 | Waters ........................... 138/140 |
| 4,097,569 | 6/1978 | Waters ........................... 264/255 |

FOREIGN PATENT DOCUMENTS

| | | |
|---|---|---|
| 489298 | 7/1938 | United Kingdom . |
| 974046 | 12/1938 | United Kingdom . |
| 1474293 | 5/1977 | United Kingdom . |
| 1253315 | 11/1977 | United Kingdom . |
| 2030510A | 9/1978 | United Kingdom . |

Primary Examiner—Dave W. Arola
Attorney, Agent, or Firm—Arnold, White & Durkee

[57] ABSTRACT

A method and apparatus for manufacturing a centrifugally cast pipe for use in a chemical and corrosive atmosphere is provided. The centrifugally cast pipe has an integrally cast socket or coupling at one end of the pipe. The socket is cast onto the pipe. At the same time that the pipe is cast, both socket and pipe are cured simultaneously, creating a homogeneous wall from body to socket through the transition zone.

4 Claims, 15 Drawing Figures

MOLDING OF INTEGRAL SOCKET CONNECTION IN CENTRIFUGALLY CAST FIBERGLASS REINFORCED PIPE

BACKGROUND OF THE INVENTION

1. Field of the Invention

This invention relates to fibrously reinforced elongated articles, including hollow elongated pressure conduits such as piping with integrally cast couplings or sockets. This invention also relates to a method of making such articles by combining a thermosetting resin with a reinforcing cylindrical sock inserted in a cylindrical rotating mold, casting the pipe by centrifugal force, and then curing to produce a hard reinforced plastic pipe having the general shape of the mold.

2. Description of the Prior Art

Essentially two methods of constructing fiberglass reinforced pipe are known. The first method is known as a wrap method, wherein doped or impregnated fiberglass material is wrapped around the exterior surface of a mandrel which forms the inside diameter of the pipe. Successive layers of the doped fiberglass material are wrapped until the outside diameter of the pipe is achieved. The wrap method is labor intensive and therefore very expensive.

An alternate and more economical method of manufacturing fiberglass reinforced pipe is by centrifugally casting the pipe. This method and its product have been described in various documents, among them U.S. Pat. No. 3,093,160 to Herbert D. Boggs.

A typical apparatus for producing centrifugally cast fiberglass reinforced pipe has been described in U.S. Pat. No. 3,112,530 to Herbert D. Boggs. Suitable materials for use in the manufacture of the pipe have been described in U.S. Pat. Nos. 4,018,250 to William D. Waters and 4,097,569 to William D. Waters.

Centrifugally cast fiberglass reinforced pipe has generally consisted of a tubular product with a uniform inside diameter and a uniform outside diameter. To be manufactured in a commercially feasible manner the pipe is cast in standard lengths, typically 10, 20 and 30 foot lengths. However, to be used in a practical installation such as a chemical refinery or a waste water treatment facility the lengths of pipe must be joined together. The joining of the pipe has been accomplished by means of either molded couplings or handwrapped couplings. Each end of a coupling is glued or cemented to one end of a separate length of pipe. This end-to-end joining of lengths of pipe through couplings is labor intensive, expensive and time consuming.

Joining two lengths of centrifugally cast fiberglass reinforced pipe by means of a coupling can sometimes produce failure in the coupled pipe as there has been no practical way to guarantee that each length of pipe penetrates one-half the length of the coupling. Unless each length of pipe penetrates only half of the coupling, the integrity of the pipe and the coupling can not be relied upon. Thus premature and unwanted leaks of the piping system have been encountered.

SUMMARY OF THE INVENTION

A method and apparatus is disclosed for a centrifugally cast pipe comprising a cylindrical body portion and an integral socket portion at one end, the pipe further comprising thermosetting plastic reinforced with fibrous reinforcing material distributed essentially throughout the thermosetting plastic.

The length of pipe immediately intermediate the body portion and the socket or coupling portion tapers outwardly from the outside diameter of the body portion to the outside diameter of the socket or coupling portion. The inner wall surface of the socket portion is recessed from the free end of the socket portion to a point intermediate, the length of the recessed socket portion defines a shoulder, with the shoulder beveled to transition from the inside diameter of the pipe to the inside diameter of the socket shoulder.

The pipe is manufactured by centrifugal casting process by centrifuging a sleeve of reinforcing fibers about its longitudinal axis within a centrifugal casting mold which has a recess portion extending into the mold from a first end of the mold. The sleeve is tapered to conform it to the shape of the mold. A recess is formed in the internal wall surface of the sleeve to recess a portion of the sleeve extending from the first end and forming a shoulder on the internal wall surface intermediate the ends of the recessed portion of the mold. The mold is rotated further expanding the glass sleeve, while at the same time a supply of viscous plastic is injected into the interior of the sleeve; while the mold continues to rotate thus, centrifuging the plastic throughout the sleeve. Curing is accomplished by maintaining the temperature within the mold to set the centrifuged plastic while continuing to turn the mold.

An air expansion apparatus is also disclosed to expand the fibrous material from the diameter of the mold to the diameter of the integrally cast socket.

DETAILED DESCRIPTION

Figure 1:
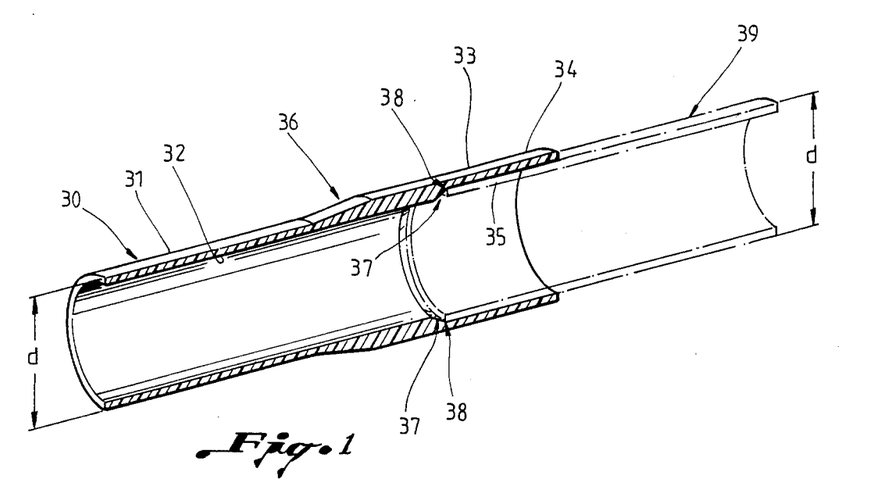
FIG. 1 illustrates the joinder of two centrifugally cast fiberglass reinforced pipes using an integral coupling or socket on one end of one of the pipes.

FIG. 1 illustrates a centrifugally cast fiberglass reinforced pipe 30 with an outside cylindrical surface 31 and an inside cylindrical surface 32. On one end of the centrifugally cast fiberglass reinforced pipe is an integrally cast coupling or socket 33. The coupling or socket 33 has an outside cylindrical surface 34 and an inside cylindrical surface 35. The outside cylindrical surface 33 of the pipe 30 fits the inside cylindrical surface 35 of the integrally cast coupling 33.

A transition from the outside diameter of the pipe 30 to the outside diameter of the socket or coupling 33 occurs at transition zone or area sometimes referred to as an upset or transition area. The inside diameter of the pipe 30 is uniform throughout the transition area. Maintaining the uniformity of the inside diameter of the pipe 30 through transition area 36 reduces the stresses encountered through such transition areas. By reducing these stresses, the likelihood of pipe rupture is also reduced.

A stop for the uniform inside diameter of the pipe 30 is provided by shoulder 37. A bearing surface 38 perpendicular to the longitudinal axis of the pipe extends between tapering shoulder 37 and the inside diameter of the coupling or socket 33.

As shown in FIG. 1, the bearing surface 38 on pipe 30 serves as a bearing surface and a stop for the length of pipe 39 which is coupled to the integral socket or coupling. The length of pipe 39 coupled to the integral socket or coupling has an outside diameter which fits within the inside diameter of the integral socket 33.

Figure 2:
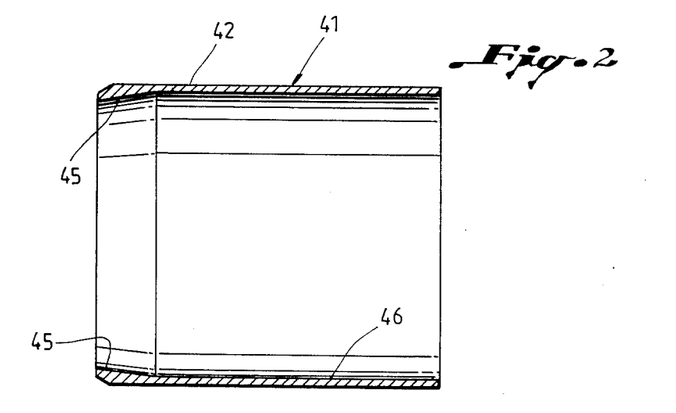
FIG. 2 illustrates a bell end slip device.
Figure 4:
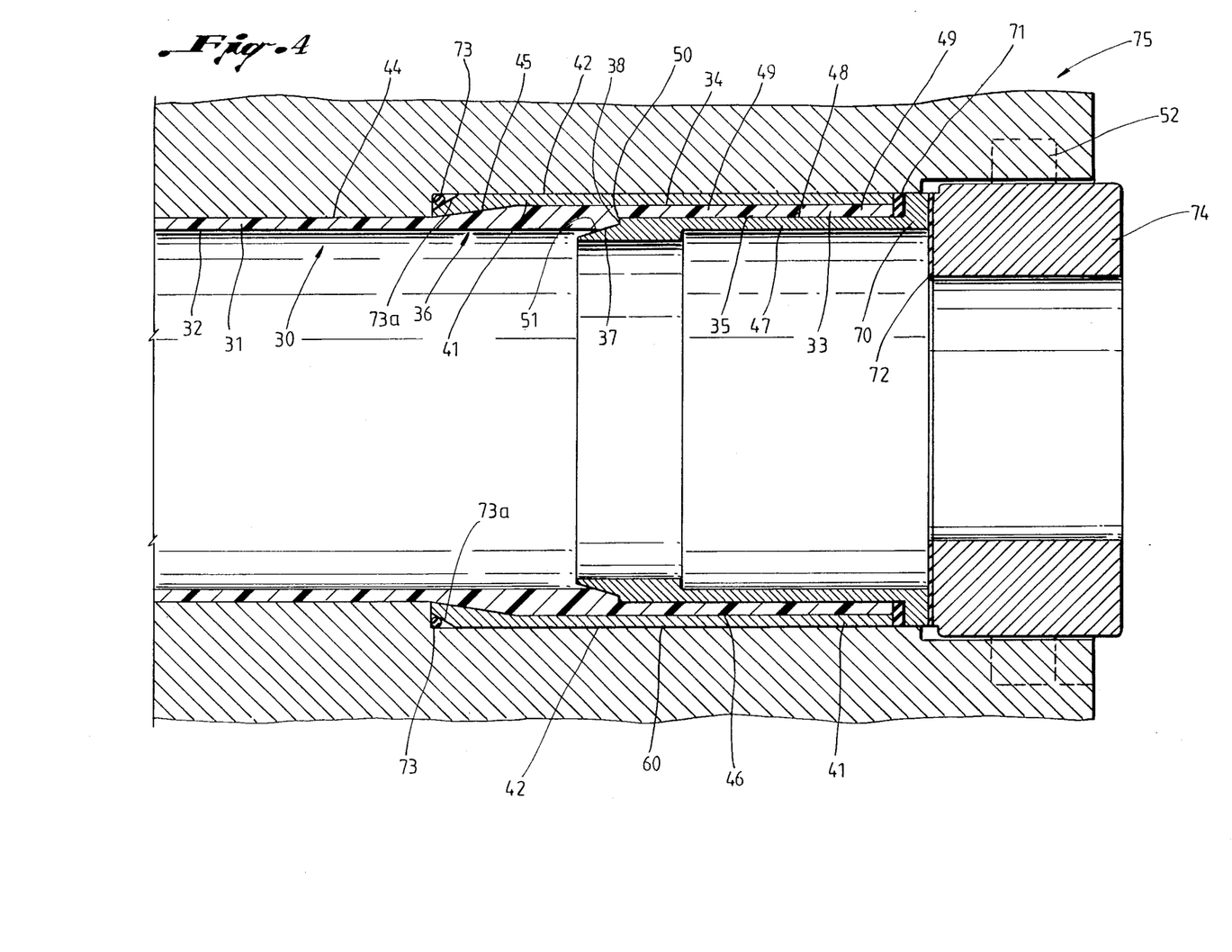
FIG. 4 illustrates the bell end slip device and the socket form device in a casting mold.

Referring generally to FIGS. 1, 2 and 4 the transition zone or area 36 is formed by bell end slip 41. Bell end slip 41 has an outer cylindrical surface 42, and its outside diameter fits within the inside diameter of a first recessed portion 60 in the mold tube 75. The mold tube 75 also has a central cylindrical surface 44 which fits around the outside cylindrical surface 31 of the pipe 30.

Bell end slip 41 has a tapering internal surface 45 which mates with the tapering external surface or transition area 36 of pipe 30. The tapering surface 45 serves as a transition from the central cylindrical surface 44 of the mold tube 75 to the inner cylindrical surface 46 of the bell end slip 41.

Figure 3:
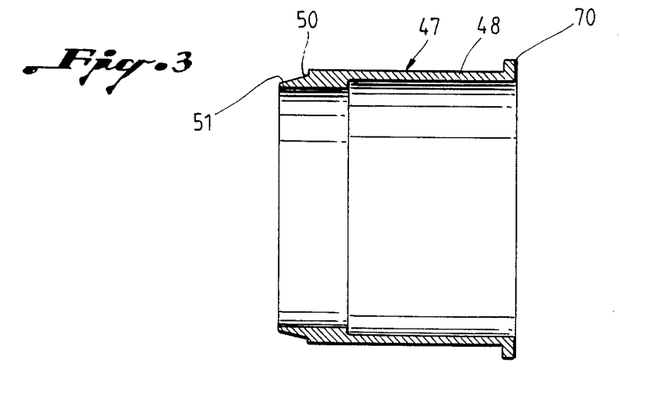
FIG. 3 illustrates a socket form device.

To form tapering shoulder 37 and bearing surface 38 a socket form 47 is concentrically inserted into the bell end slip 41. Socket form 47 has an outer cylindrical surface 48 which defines an annular space 49 with the inner cylindrical surface 46 of bell end slip 41 to form the desired wall thickness of the integral socket 33 of pipe 30.

Shoulder surface 50 of socket form 47 provides the forming mechanism for bearing surface 38. Sloping surface 51 of socket form 47 slopes off from shoulder surface 50 to aid in the withdrawal of socket form 47 after the manufacturing process is complete.

Socket form 47 terminates at its external end in a shoulder or flange 70. The outside diameter of the flange 70 fits within the inside diameter of the first recessed portion 60 of the mold tube 75, and it also corresponds to the outside diameter of the end bell slip 41. A first gasket 71 fits between the flange 70 and the external end of end bell slip 41 to seal the annular space 49 between these two members. A second gasket 72 fits between the external surface of flange 70 and the internal end of locking ring 74. The external cylindrical surface of locking ring 74 is conveniently threaded or slotted to engage corresponding threads or locking slots on the inner cylindrical surface of the mold tube 75.

First gasket 71 and second gasket 72 are preferably neoprene rubber or other gasket material capable of withstanding elevated temperatures.

Referring to FIG. 4, an O-ring 73 is placed between first recessed portion 60 of mold tube 75 and tapering shoulder 73a of bell end slip 41. The O-ring 73 facilitates the withdrawal of bell end slip 41 by minimizing the inadvertent seepage of resin between outer cylindrical surface 42 of bell end slip 41 and the first recessed portion 60 of mold tube 75.

Additionally, the inside cylindrical surface of bell end slip 41 and the outer cylindrical surface of the socket form 47 may be chromed to facilitate the withdrawal of socket form 47 and the finished pipe after the resin(s) has(have) cured.

In operation, the apparatus described above may be adapted for use with a centrifugal casting system such as that described in U.S. Pat. No. 3,112,530. Thus, the above apparatus is mounted so as to be spun about its longitudinal axis. Similarly, resins or cements such as those described in U.S. Pat. Nos. 4,018,250 and 4,097,569 may be used to bond the various components together as described hereinafter.

It is to be understood that the description of the manufacturing process is not to be read in a limiting sense but merely illustrative of a preferred method for manufacturing a centrifugally cast fiberglass reinforced pipe with an integral socket or coupling.

Figure 5:
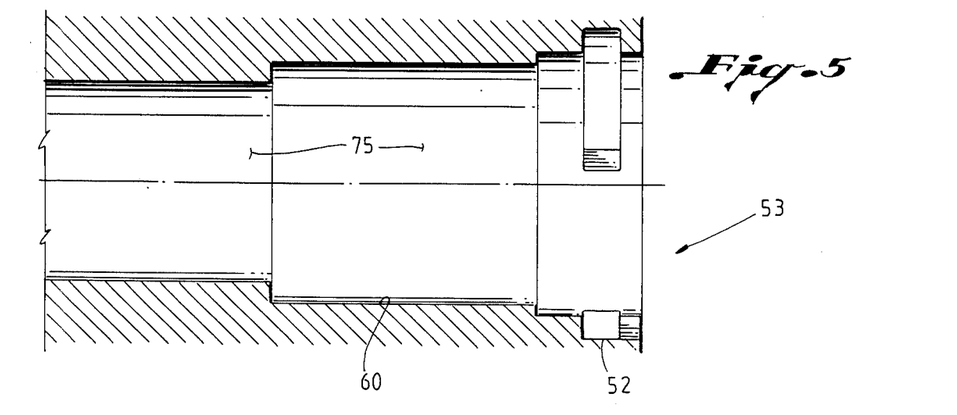
FIG. 5 illustrates the opening of an empty mold tube with a recess cavity for the bell end slip.
Figure 6:
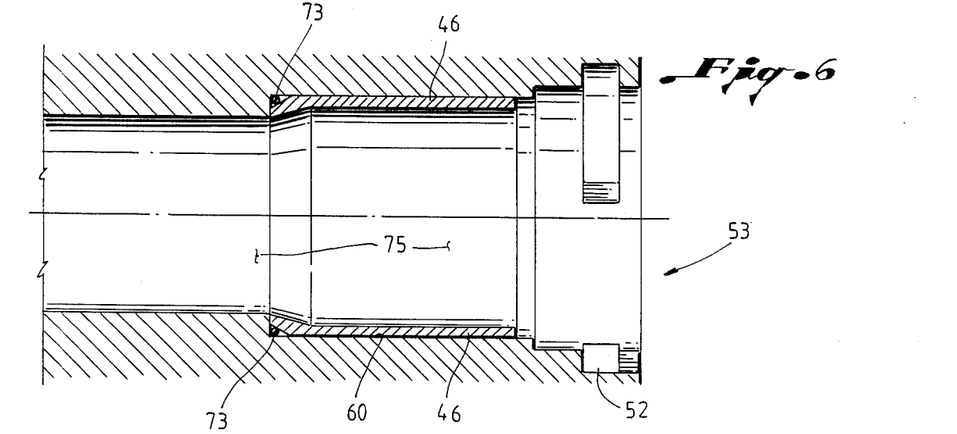
FIG. 6 illustrates the bell end slip inserted in the mold tube.

A method of casting the fiber reinforced pipe with integral socket is illustrated in FIGS. 5 through 13 inclusive in conjunction with the apparatus described above. Referring first to FIG. 5, empty mold tube 75 with locking ring recessed cavity 52 and bell end cavity 53 is mounted for rotation about its longitudinal axis. As shown in FIG. 6, a bell end slip 41 is inserted into the mold tube recessed bell end cavity 53.

Figure 7:
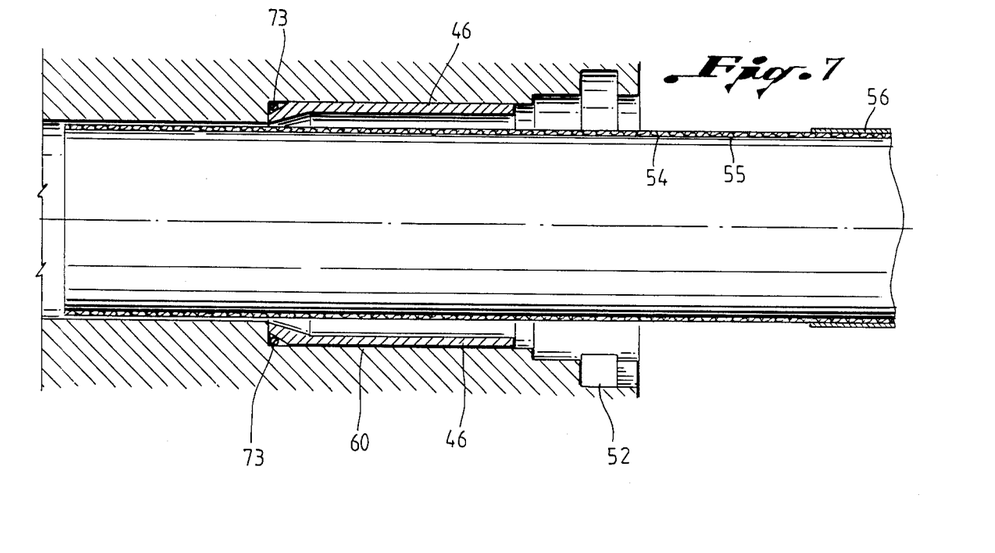
FIG. 7 illustrates the insertion of the fiberglass material into the mold tube.

A bi-axial lap glass fabric 54 (also known as knitted reinforcements), such as that available from COFAB Composite Reinforcement, a Division of Gulf States Paper, Tuscaloosa, Ala., and from KNYTEX Division of Proform, Inc., Seguin, Tex. is wrapped about a mandrel 55. Fabric with input roving of 450–1175 yards/lb. is used for 1½" through 4" pipes and fabric with input roving 250–450 yards/lb. is used for 6" through 12" pipes. The wrapping of the bi-axial lap glass fabric 54 about the mandrel 55 is accomplished by at least a 300% overlap of the ends. The fabric essentially forms a sock around the mandrel. The overlap is provided to reduce the possibility of a fracture developing where the glass fabric ends butt up against one another. The bi-axial lap fabric is oriented to yield the maximum hoop strength. The maximum hoop strength is desired because of the significantly greater hoop stresses as opposed to longitudinal stresses.

Kraft paper 56 or other similar paper or fabric is wrapped around the glass fabric to secure the glass fabric 54 to the mandrel 55 prior to insertion into the mold tube 75. The kraft paper 56 is stripped away from the fabric 54 or sock as the mandrel is inserted into the mold tube. This phase of the overall operation is shown in FIG. 7.

Figure 8:
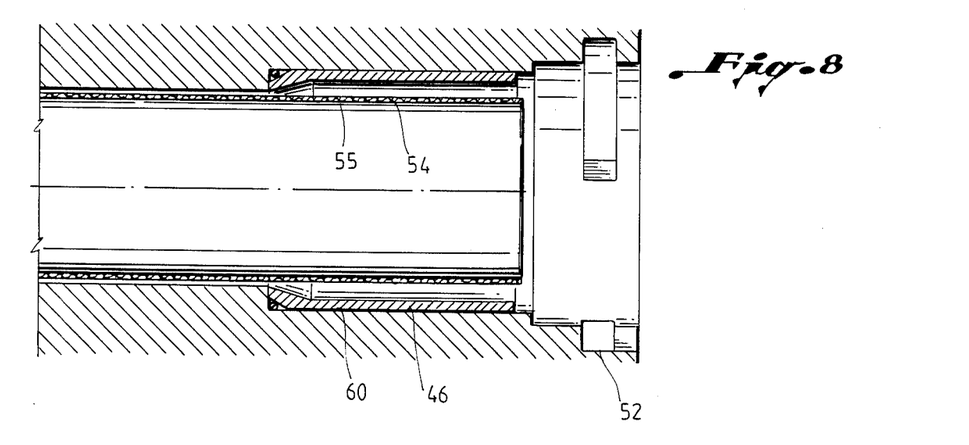
FIG. 8 illustrates the mold tube opening with the fiberglass and mandrel inserted into the mold tube.

FIG. 8 illustrates the bi-axial lap glass fabric 54 wrapped around the mandrel 55 and inserted into the mold tube 75. At this point the mold is jogged into a brief spinning movement sufficient to centrifugally lift the bi-axial fabric from the mandrel 55 and to adhere the fabric to the inner wall surface of the mold tube 75. This condition is shown in FIG. 9.

Figure 9:
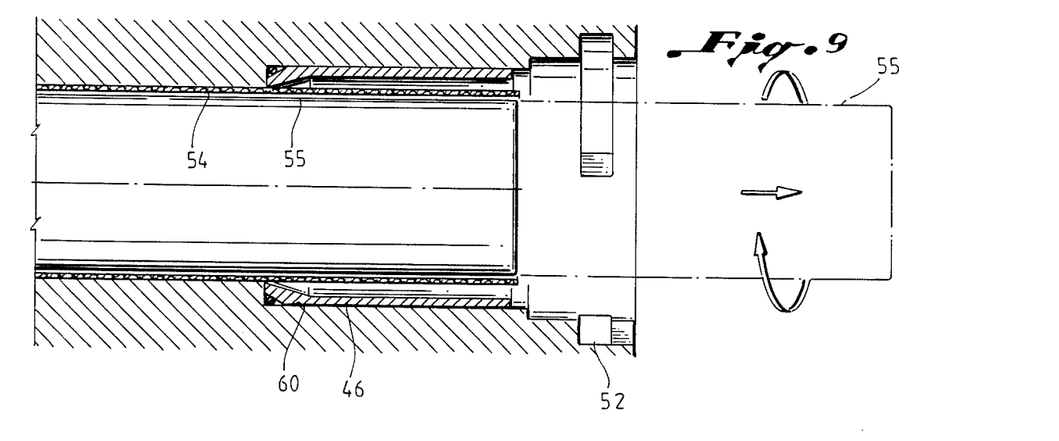
FIG. 9 illustrates the spin out of the fiberglass from the mandrel with the fiberglass conforming to the inside diameter of the mold tube and illustrates the withdrawal of the mandrel from the mold tube.
Figure 10:
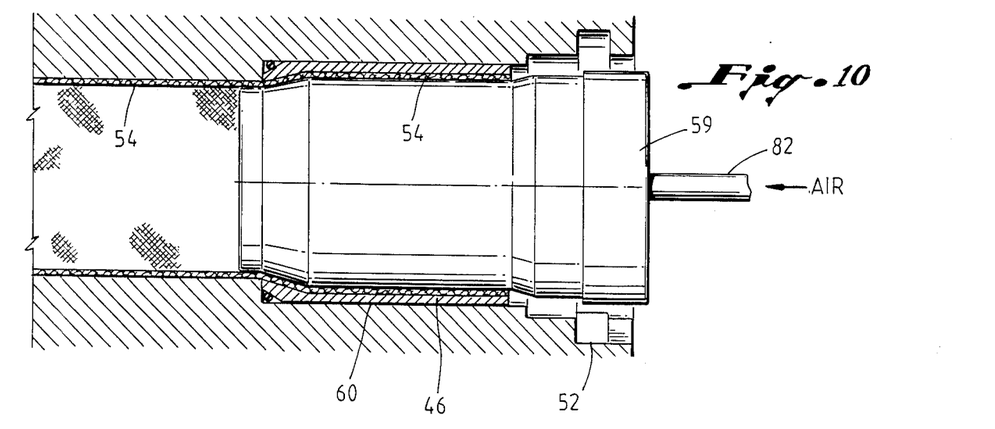
FIG. 10 illustrates the expansion of the fiberglass material to conform to the inside diameter of the bell end slip.

The mold tube rotation is then stopped, and the mandrel is removed as illustrated in FIG. 9. At this point it has been found that generally the bi-axial lap glass fabric will conform generally to the inside surface of the mold tube but not to the inside surface of the bell end slip 41. To conform the bi-axial lap glass fabric to the inside surface of the bell end slip, an expander such as an air activated expansion device 59 is inserted inside the sleeve formed by the bi-axial lap glass fabric as illustrated in FIG. 10. Care must be exercised as the air expander is inserted to prevent wrinkling of the fabric 54. Such an air activated expansion device may be constructed as follows.

Figures 14, 15:
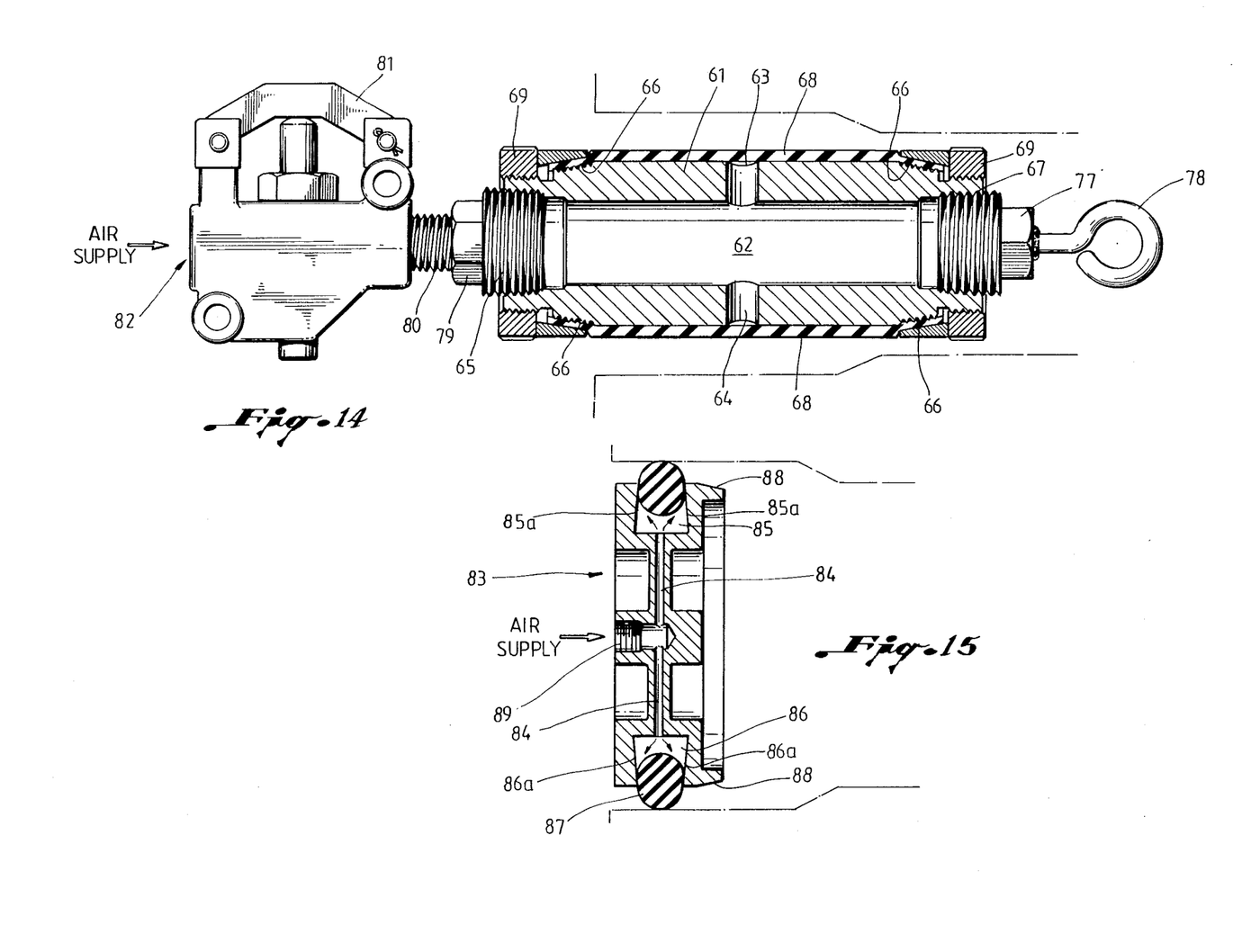
FIG. 14 illustrates an air expander device for small bore pipe.
FIG. 15 illustrates an air expander device for large bore pipe.

Referring to FIG. 14 an expander may be constructed by machining a body 61 with air chamber 62, air ports 63 and 64, inside threads 65, rubber gripping surface 66, and bearing nut threads 67. Flexible or rubber sleeving material 68 is placed over air ports 63 and 64. The rubber sleeving 68 is held in place by bearing nuts 69 squeezing the rubber material against gripping surfaces 66. A pipe plug 77 plugs one end of expander body 61. A clevis loop 78 is attached to plug 77 for ease of storage of the air expander.

A bushing 79 is used to transition from threads 65 to pipe nipple 80. Pipe nipple 80 connects the air expander body 61 to a valving mechanism 81. The valving mechanism 81 is preferably a 3-port type which allows the air chamber to be inflated and deflated by venting to atmosphere. The inflation of the air chamber is accomplished by means of a regulated air supply 82 attached to valving mechanism 81.

In the alternative an air expander can be constructed in a manner as illustrated in FIG. 15.

FIG. 15 illustrates the cross-section of an air chamber body 83 with air passages 84. The body 83 has O-ring receptacles 85 and 86 for O-ring 87. Receptacle walls 85a and 86a are tapered inwardly in an outwardly radial fashion thereby reducing the receptacle cross sectional area in a radially outward direction. This reduction in cross sectional area results in a better seal of the receptacle by O-ring 87 as the O-ring moves radially outward. Sloping surfaces 88 are formed on expander body 83 to facilitate insertion into the fabric sock 54 and minimize the possibility of snagging the sock during insertion.

An air supply valving mechanism is connected at attachment point 89. The air supply and valving mechanism are similar to those described for FIG. 14.

The use of an air activated expansion device should not be read in a limiting sense as any device which can expand the bi-axial lap fabric to conform to the inside diameter of the bell end slip may be used.

Figure 11:
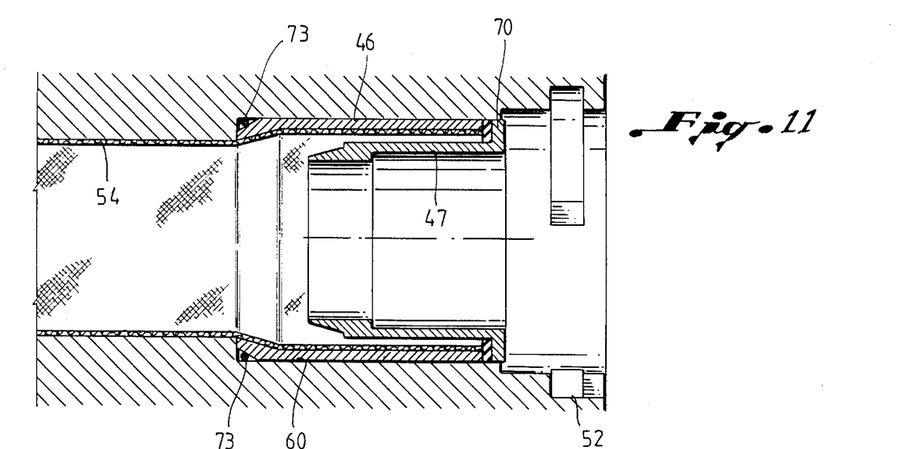
FIG. 11 illustrates the placement of the socket form tooling into the mold tube.

After the air activated expansion device 59 has been used to expand the bi-axial lap glass fabric to conform to the inside diameter of the bell end slip, this device is removed and the socket form 47 tooling is inserted as illustrated in FIG. 11.

The socket form 47 has an outside diameter which conforms to the inside diameter of the sleeve of bi-axial lap glass fabric which has been created by expansion of the air activated expansion device. Care must be exercised at the time the socket form is inserted into the mold tube to prevent wrinkling of the glass fabric 54. Wrinkling of the glass fabric 54 may weaken the socket portion of the pipe to be produced and thereby lead to leaking or failure of the socket.

Figure 12:
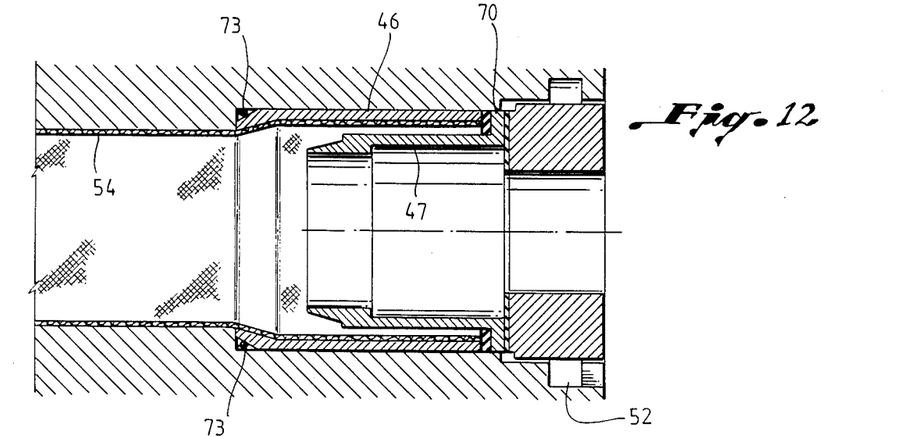
FIG. 12 illustrates the securing of the bell end slip and the socket form tooling with a locking ring.

After inserting the socket form 47 tooling, a locking ring 74 such as that illustrated in FIGS. 1 and 12 is placed over the opening of the mold tube thereby securing the bell end slip and the socket form tooling.

Figure 13:
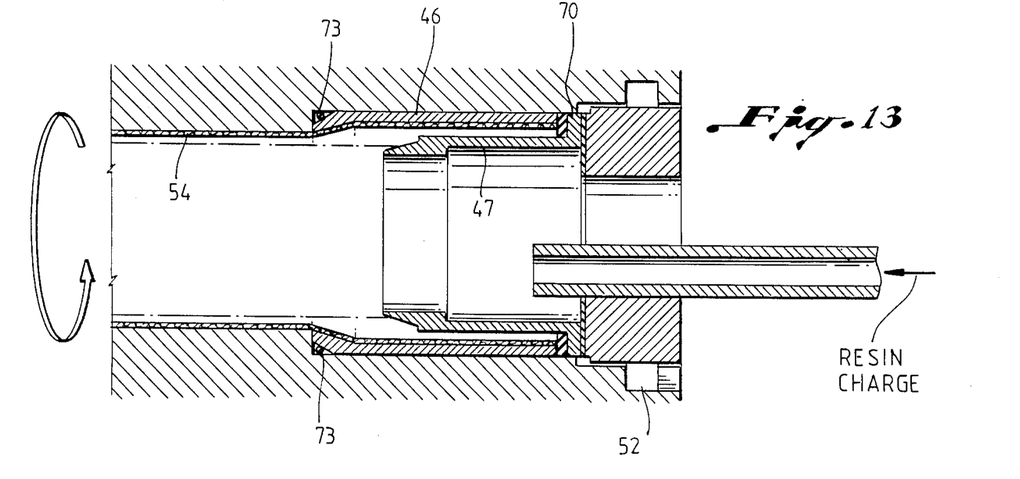
FIG. 13 illustrates the finished assembly with the locking ring in place with the mold tube ready for charging with resin through the aperture in the locking ring.

Referring to FIG. 13, the finished assembly as viewed from the end of the casting machine is now ready for resin injection. The casting machine is rotated while at the same time charging the interior of the sleeve with resin. Further, rotation of the mold tube by an external motive force (not shown) results in a centrifugal force of approximatley 120 to 150 g's which causes the resin material to saturate the bi-axial glass fabric. The centrifugally cast pipe with its integral socket is cured in place with heat supplied from an internal hot oil bath (not shown) around the mold tube. The pipe assembly and mold tube are rotated during the curing process to prevent the top side of the pipe from caving in. After the pipe and socket are fully hardened or cured, the finished pipe is extracted from the mold tube following removal of the locking ring 74 and the socket form 47.

The pipe extracted from the mold tube is a length of pipe 30 with an integrally cast coupling or socket 33 with a smooth transition zone 36 from the pipe outside diameter to the coupling or socket outside diameter. The finished pipe also has a sloping shoulder 37 and a bearing surface 38 concentrically positioned on the inside of the bell end. The stop and bearing surface serve to limit the penetration of a length of pipe to be coupled to the integral socket or coupling.

The centrifugally cast pipe with its integral coupling or socket thus provides a method of joining successive lengths of pipe without the use of separate couplings. The inside diameter of the integral socket or coupling conforms to the outside diameter of a successive length of pipe. The successive lengths of pipe are joined by gluing or cementing the outside diameter of a length of pipe to the inside diameter of the integral socket or coupling.

Further modifications and alternative embodiments of the inventive apparatus and method will be apparent to those skilled in the art having the benefit of this disclosure. Accordingly, this description and the methods described herein are to be construed as illustrative only and for the purpose of teaching those skilled in the art the manner of carrying out the invention. Equivalent materials may be substituted for those specifically illustrated and described herein, and certain features of the invention may be utilized independently of the use of other features. All this will be apparent to one skilled in the art after having the benefit of this disclosure.

What is claimed is:

1. The method for forming a centrifugally cast pipe with an integral socket comprising:
 (a) inserting a bell end slip into an empty mold tube of a centrifugal casting machine;
 (b) inserting a sock of fibrous reinforcing material into the mold tube of the centrifugal casting machine, the sock of fibrous material inserted with a mandrel;
 (c) rotating the mold so as to distribute the fibrous reinforcing material onto the mold and away from the mandrel;
 (d) stopping the rotating mold and removing the mandrel;
 (e) expanding the fibrous reinforcing material to conform the fibrous reinforcing material to the inside diameter of the bell end slip;
 (f) placing the socket form tooling into the mold tube;

(g) securing the bell end slip and socket form tooling in place with a locking ring;

(h) rotating said mold to further expand the glass fabric;

(i) injecting into the bore of the mold tube at least one thermosetting resin while continuing to rotate the mold to distribute the thermosetting resin(s) longitudinally thereof; and (j) maintaining the temperature of said mold while rotating the mold to cure the thermosetting resin(s).

2. The method according to claim 1 wherein the fibrous reinforcing material is a bi-axial lap fabric reinforcing material.

3. A centrifugally cast pipe with an integral socket produced by the process comprising:

(a) inserting a bell end slip into an empty mold tube of a centrifugal casting machine;

(b) inserting a sock of fibrous reinforcing material into the mold tube of the centrifugal casting machine, the sock of fibrous material inserted with a mandrel;

(c) rotating the mold so as to distribute the fibrous reinforcing material to the mold and away from the mandrel;

(d) stopping the rotating mold and removing the mandrel;

(e) expanding the fibrous reinforcing material with an expander to conform the fibrous reinforcing material to the inside diameter of the bell end slip;

(f) placing the socket form tooling into the mold tube;

(g) securing the bell end slip and socket form tooling in place with a locking ring;

(h) rotating said mold to further expand the glass fabric;

(i) injecting into the bore of the mold tube at least one thermosetting resin while continuing to rotate the mold to distribute the thermosetting resin(s) longitudinally thereof; and (j) maintaining the heat of said mold while rotating the mold to cure the thermosetting resin(s).

4. The centrifugally cast pipe with integral socket according to claim 3 wherein the fibrous reinforcing material is a bi-axial lap fabric reinforcing material.

* * * * *